June 14, 1966  G. K. HAUSE  3,255,643
VEHICLE POWER PACKAGE
Original Filed June 6, 1961  2 Sheets-Sheet 1
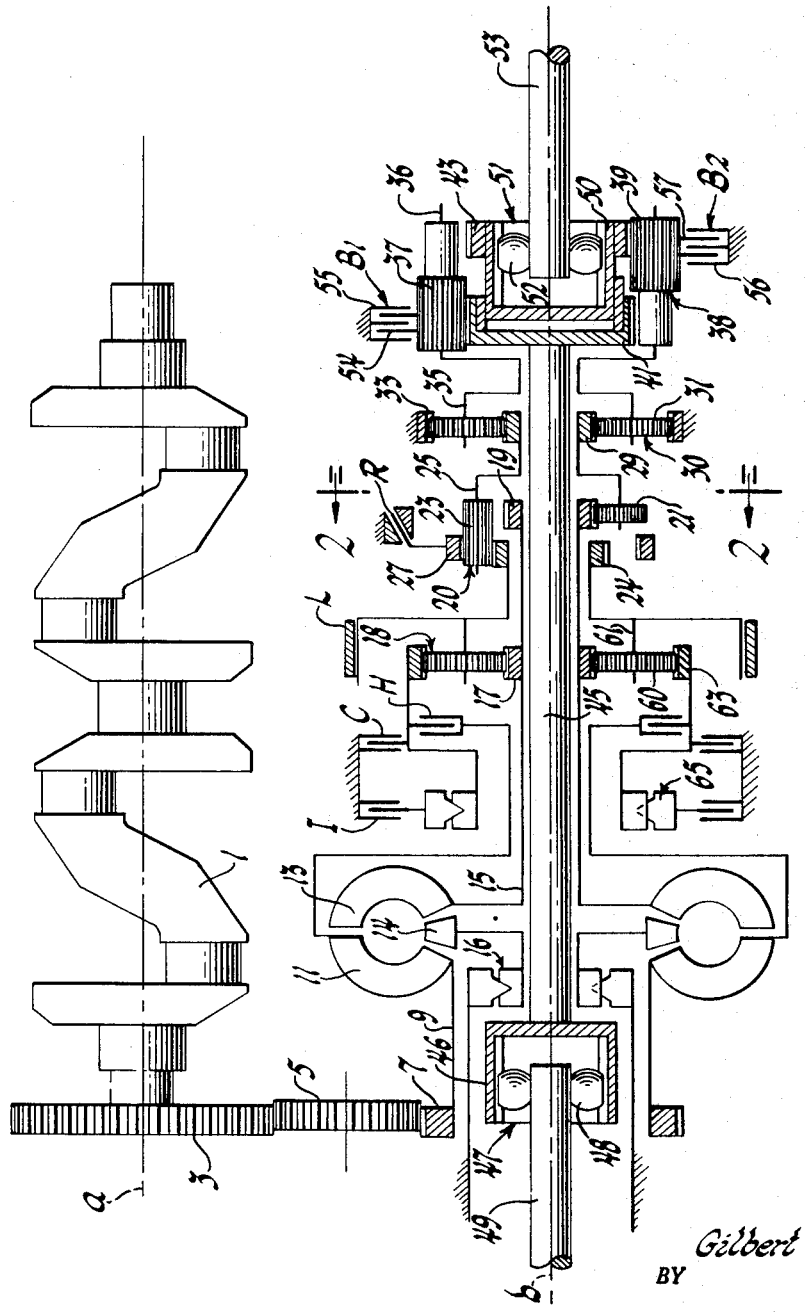
INVENTOR.
Gilbert K. Hause
BY
A.W.Heiter
ATTORNEY June 14, 1966  G. K. HAUSE  3,255,643
VEHICLE POWER PACKAGE
Original Filed June 6, 1961  2 Sheets-Sheet 2
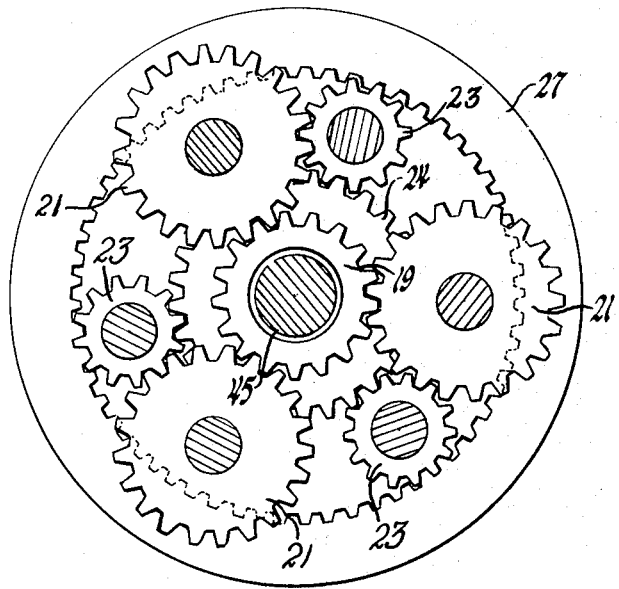
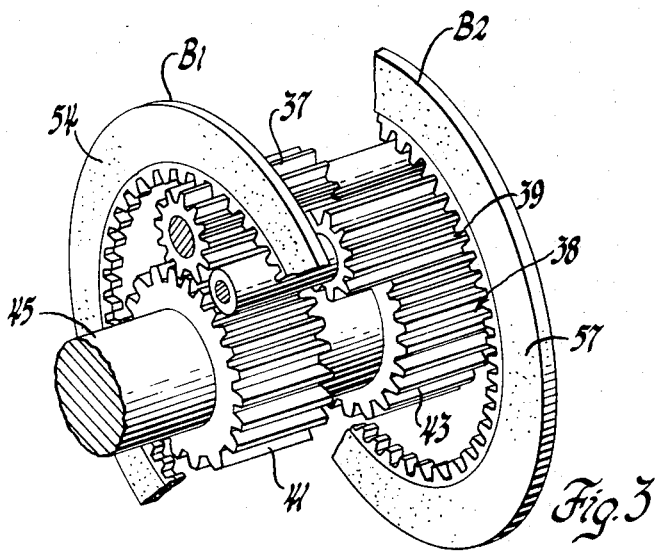
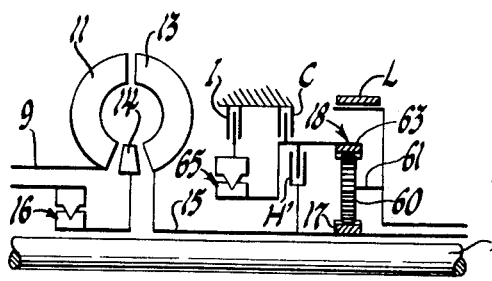
INVENTOR.
Gilbert K. Hause
BY
ATTORNEY

United States Patent Office 3,255,643
Patented June 14, 1966

3,255,643
VEHICLE POWER PACKAGE
Gilbert K. Hause, Bloomfield Hills, Mich., assignor to General Motors Corporation, Detroit, Mich., a corporation of Delaware
Original application June 6, 1961, Ser. No. 115,205, now Patent No. 3,205,730, dated Sept. 14, 1965. Divided and this application Jan. 8, 1965, Ser. No. 424,429
12 Claims. (Cl. 74—695)

This invention relates to power transmission systems and more particularly to motor vehicle drives utilizing combined change speed transmission, final drive differential and vehicle brake units, and is a division of application Serial No. 115,205, filed June 6, 1961, now Patent No. 3,205,730.

There is a growing trend in motor vehicle design to combine the change speed mechanism with the final axle drive. A further combination includes the engine, transmission, final gear reduction, differential and even the vehicle brakes as a single compact unit. An example of such a combination is shown in my application S.N. 855,840 entitled "Power Transmission System," filed November 27, 1959, now Patent 3,029,662. The combined unit, or power package as it is sometimes called, shown in the above-mentioned patent has the engine and a portion of the change speed transmission including a hydraulic torque converter on one axis and the rest of the change speed transmission, the final gear reduction, differential brake, universal joints and drive axles on a second axis spaced from and parallel to the engine axis. In order to provide additional space for a larger engine it would be desirable to include the complete change speed transmission on the axle axis.

Currently there are a wide range of engines being used in motor vehicles. The size of these range from a few dozen to hundreds of horsepower. To accommodate all of the engines used in economy cars, small cars, large cars, etc., it has been necessary to provide a number of different transmissions to accommodate all of these engines. This is necessary because of the different speed, torque and horsepower performance characteristics of the different sized engines. The present invention contemplates a power unit wherein it is relatively easy to provide different fixed speed ratio drives between the engine and the hydraulic torque converter and also easy to vary the final gear reduction to supply the proper overall torque and speed drive to the wheels of the motor vehicle.

It is therefore an object of this invention to provide a compact power unit including an engine, change speed transmission, differential, brakes and drive axles.

It is still another object to provide a power unit including a hydraulic torque converter wherein a variety of engines can operate at a desirable speed and torque conditions and yet in which the torque converter will be operated at proper stall speeds and torque curve conditions.

A further object is to provide a relatively simple change speed transmission including a hydraulic torque converter and three speed gearing.

Still another object is to provide a differential mechanism combined with a change speed transmission and including integral braking mechanism for stopping the vehicle.

These and other objects and advantages will be apparent to those skilled in the art from the following specification and figures in which:

FIGURE 1 is a schematic representation of the invention showing a part of an engine—transmission—differential and brake unit;

FIGURE 2 is a sectional view taken on the line 2—2 of FIGURE 1;

FIGURE 3 is a schematic view showing details of the differential and brake assembly; and FIGURE 4 is a schematic representation of a modified transmission with only a portion of the complete unit shown.

Referring to FIGURE 1, illustrating one application of the invention, there is shown a combined transmission, differential and brake unit incorporated in a single power package that includes an engine having a crankshaft 1. The engine, which forms no part of the invention, may be of any suitable form and may be located at any suitable vehicle location. A suitable engine is shown in my copending application S.N. 37,759, filed June 21, 1960.

The crankshaft 1 rotates on an axis $a$ and rotates a gear 3 which drives an idler gear 5 which in turn drives a gear 7. The gear 7 is connected in any suitable manner to an input shaft 9 of the combined transmission differential unit. By proper selection of the gears 3, 5 and 7, various fixed engine output to transmission input ratios can be secured. The gearing shown provides a one to one ratio, however, if a small high speed engine is used the gearings 3, 5, 7 could provide a speed reduction whereas if a large relatively slow speed engine is used, these gears can provide an overdrive ratio. In any event the engine can be operated at a speed wherein its torque is at or near a maximum when the stall speed of the torque converter is reached. Other drive connections than the gears 3–5–7 could be utilized to transmit the power or change the speed of the drive from the engine to the transmission, for example, a chain drive, belt drive, etc.

The combined transmission, differential and brake unit is rotatable about an axis $b$ spaced from and parallel to the engine axis $a$. The transmission input shaft 9 is connected to a vaned impeller member represented by the vane 11. The impeller 11 is shown as part of a conventional three element hydraulic torque converter which also includes vaned turbine member represented by the vane 13 connected to a converter output shaft 15, and a vaned stator member represented by vane 14. Backward rotation of the stator 14 is prevented by a one-way device represtend by the ratchet device 16. Other forms of hydrodynamic torque transmitting devices may be used in place of the three element converter shown.

The torque converter output shaft 15 connected to the turbine 13 is connected to drive a pair of sun gears 17 and 19, the sun gear 17 being formed as part of a simple planetary gear unit, generally designated 18, and the sun gear 19 being formed as part of a compound planetary gear unit, generally designated 20. The gear unit 20 includes a pair of intermeshing planet pinions 21 and 23 rotatable on the carrier member 25. The pinions 21 are relatively short and mesh with a small diameter sun gear 19, while the pinions 23 are longer and mesh with a second larger diameter sun gear 24. As will be explained later the sun gear 19 is an input gear, while the sun gear 24 functions either as a forward reaction gear or an input gear. A ring gear 27 that functions as a reverse reaction gear, meshes with the long pinions 23. The brake band L anchored to a stationary part of the mechanism, can be applied to hold the sun gear 24 from rotation and a cone brake R can be applied to hold the ring gear 27 from rotation.

The output carrier 25 of the gear unit 20 is connected to an input sun gear 29 of another simple planetary gear unit, generally designated 30, and which includes a plurality of planet pinions 31 rotatable on a carrier 35 and meshing with a stationary ring gear 33 fixed to the transmission-differential housing. The carrier member 35 is connected to still another planet carrier 36 formed as part of a differential unit, generally designated 38.

As seen in FIGURES 1 and 3 the differential unit 38 includes one or more pairs of intermeshing pinions 37 and 39 rotatable on the carrier member 36. Only one pair of pinions 37 and 39 are shown. A sun gear 41 meshes with the pinion 37 while a second sun gear 43 meshes with the pinion 39. The sun gear 41 is connected in any suitable manner to drive a shaft 45 that extends through the transmission shaft 15 and which carries the outer drive member 46 of an axially sliding or pot type universal joint, generally designated 47. This universal joint 47 also has an axial sliding pivot pin 48 connected to and driving an output shaft or axle 49. The sun gear 43 is splined on or otherwise drivingly connected to the outer element 50 of a second axially sliding or pot type universal joint, generally designated 51, that has a sliding pivot pin 52 connected to and driving a second output shaft or axle 53. The axle shafts 49 and 53 thus form a swing axle vehicle wheel drive. As shown in FIG. 1 the universal joints 51 and 47 are respectively located within the confines of the differential unit 38 and input shaft 9 efficiently utilizing available space and providing a more compact power package.

Surrounding the planet pinions 37 of the differential unit 38 are a plurality of brake discs 54 having internal teeth that mesh with the teeth of planet pinions 37. The brake discs 54 form the rotatable portion of a multiple disc brake assembly, generally designated B$_1$, and which includes stationary disc members 55. A second multiple disc brake assembly, generally designated B$_2$, includes stationary disc 56 alternatively stacked with a plurality of discs 57 having internal teeth meshing with the planet pinions 39. Suitable actuating means, not shown, operate to engage the rotatable discs with the stationary discs of each brake unit.

Referring again to the first planetary gear unit 18, it will be seen that this gear unit includes a plurality of planet pinions 60 rotatable on a carrier 61 that is drivingly connected to the sun gear 24 of the compound gear set 20. Surrounding and meshing with the planet pinions 60 is a ring gear 63 whose rotation in either direction can be prevented by a multiple disc brake C. The reverse rotation of gear 63 can also be prevented by a multiple disc brake I connected to the ring gear 63 by means of a free-wheel or one-way device represented by the ratchet member 65. Thus when the brake C is engaged, the ring gear 63 is prevented from rotation in either direction, while energization of the brake I will prevent reverse rotation of the ring gear 63. A multiple disc clutch assembly H acts to connect the ring gear 63 with the impeller 11 and hence transmission input shaft 9. Suitable actuating means for brakes C and I, as well as clutch H, would be provided but are not shown since the details of the same form no part of the invention.

OPERATION

To obtain a neutral condition, the brakes I, C, L, R and the clutch H are all disengaged. Under this condition, there is no gear reaction in either the planet unit 18 or compound planet unit 20 and hence any rotation of the sun gears 17 and 19 by the shaft 15 being driven by the turbine 13 will not cause any drive to be transmitted to the carrier 25.

To start the vehicle, the low band L is applied to hold the sun gear 24 from rotation and provide gear reaction for the unit 20. Operation of the engine crankshaft 1 to turn the gears 3, 5, 7, shaft 9, to rotate the impeller 11 will cause the impeller to circulate working fluid, in a known manner, to act on the turbine vanes 13, to rotate the turbine in a forward direction. Rotation of the turbine 13 causes forward rotation of the sun gears 17 and 19 and with the sun gear 24 held against rotation by the brake band L, the carrier 25 is caused to rotate forwardly at a reduced speed.

The torque converter operates as a conventional three element converter to initially provide torque multiplication due to the stator 14 redirecting the rotating oil or fluid from the turbine into a forward direction when re-entering the impeller vanes 11. The torque multiplication of the converter is gradually reduced as the turbine 13 increases its rotational speed until oil leaving the turbine vanes 13 cause the stator 14 to free-wheel forwardly at which time the converter performs as a fluid coupling with minimum slip.

Rotation of the carrier 25 is at increased torque and a reduced speed due to the combined effect of any ratio of the gears 3, 5, and 7, the torque multiplication in the hydraulic torque converter and the torque multiplication of the gear set 20 as determined by the gear tooth ratios of that gear unit. The carrier 25 drives the sun gear 29 forward and since the ring gear 33 is stationary, the output carrier 35 rotates at still a further reduced speed and increased torque ratio. This causes the differential carrier 36 to rotate forwardly and through the mutual reaction of the meshing pinions 37 and 39 drive the sun gears 41 and 43. The drive from the sun gears 41 and 43 is then through the universal joints 47 and 51, the axles 49 and 53 to the driving wheels, not shown. The sun gears 41 and 43 and connected elements are caused to rotate forward at the speed of the carrier 36. If the load on either driving axle is greater than on the other driven axle, the differential arrangement will permit the axles to rotate at different speeds. The sun gears 41 and 43 then rotating relative to each other causing the pinions 37 and 39 to rotate relative to each other.

During this low drive operation, the sun gear 17 is driven forward and the carrier 61 of the planet unit 18 held against rotation. This causes the ring gear 63 to rotate reversely, such rotation being permitted because the brakes I and C are disengaged and the clutch H is also disengaged. Upon obtaining sufficient vehicle speed in low gear, the band L is disengaged and the brake I engaged. Rotation of the sun gear 17 then effects a reduced speed forward drive of the carrier 61 and sun gear 24, the ring gear 63 acting to provide the gear reaction in the gear set 18. This reaction is taken through the brake I and one-way device 65 which act to prevent rearward rotation of the ring gear 63. With the sun gear 19 rotating at the speed of the turbine 13 and the sun gear 24 rotating forwardly but at a slower speed than that of the turbine due to the gear reduction caused by the gear set 18, the carrier 25 is caused to rotate forward at a reduced speed which is faster than that obtained in low gear when the sun gear 24 is held against rotation. The drive from carrier 25 then is through the final reduction gear unit 30 and the differential unit 38 in the same manner as in low gear described above.

Highest gears is effected by applying the clutch H which connects the ring gear 63 to the impeller 11 to cause the same to rotate at the same speed as the transmission input shaft 9. At this time the sun gear 17 is rotating at the same speed as the turbine member 13, whose speed is only slightly less than that of the impeller 11 when the torque converter is operating as a fluid coupling. The free-wheel device 65 allows this forward rotation of the ring gear 63. The power from the engine shaft 1 transmitted through the input shaft 9 is then split into two paths with part being transmitted mechanically through the clutch H to the ring gear 63 and a portion being transmitted hydraulically through the torque converter to the turbine 13, shaft 15 and sun gear 17. Under these conditions the carrier 61 of the gear set 18 is caused to rotate forwardly at slightly less than the speed of the input shaft 9 and drives the sun gear 24 at this speed. Since the sun gear 19 is rotating at the turbine speed which is also only slightly less than the speed of the shaft 9, the carrier 25 is driven at a speed slightly less than that of the input shaft 9. This speed is reduced and the torque multiplied by the final gear reduction unit 30 whose output at the carrier 35 is transmitted through the differential unit 38 and the universal joints 47 and 51 to the drive axles 49 and 53.

To slow the vehicle or hold it stopped, the brakes $B_1$ and $B_2$ are simultaneously applied by any suitable mechanism and control. This action acts to retard or stop rotation of the discs 54 and 57. The rotation of planet pinions 37 and 39 about the main axis $b$ is retarded since these pinions can turn or rotate on the carrier only if they are turning at different speeds or in opposite directions. This combined retardation of the rotation of pinions 37 and 39 around the main differential axis $b$ as well as on their own axes, retards the rotation of the sun gears 41 and 43. This slows the wheels and the vehicle. With the discs 54 and 57 held stationary as when the vehicle is completely stopped, the sun gears 41 and 43 are held against any rotation.

In order to provide additional engine braking, as when descending a hill, the disc brake C can be applied to prevent rotation of the ring gear 63 in either direction. This conditions the transmission for intermediate drive and if the vehicle is coasting the wheels will act to drive the axles 49–53 and the differential 38. The differential carrier 36 will drive the carrier 35 of the final reduction unit 30 to cause an overdrive of the sun gear 29. This overdrive is further increased in speed by the gear sets 18 and 20 to overdrive the turbine 13 at a high rate of speed. The impeller 11 connected to the engine acts to slow the rotation of the turbine 13 and through the gearing and differential slows the wheels and vehicle.

The modification shown in FIGURE 4 is essentially the same as that of FIGURES 1 to 3 with the exception that the high gear clutch H' acts to connect the ring gear 63 and sun gears 17. This acts to lock up the planetary unit 18 and to directly transmit drive from the turbine 13 to the sun gear 24 of the compound gear unit 20. Thus in high drive both sun gear 24 and sun gear 19 of the planetary unit 20 (FIGURE 1) are driven at the turbine speed and the carrier 35 is driven at turbine speed. In this case all of the torque is transmitted through the torque converter.

In the case of FIGURE 1 when the high clutch H connects the ring gear 63 to the transmission input shaft 9 the torque is split into a mechanical and a hydraulic path and recombined at gear unit 18.

It should be pointed out that the engine may be a straight four cylinder, a V–8 or any other form. By varying the ratio of the gears 3, 5, and 7, as well as the ratio of the final reduction gear unit 30, the transmission differential can be used with a variety of engines and in a variety of vehicles. The combined unit may be used in a front wheel drive or a rear wheel drive vehicle. The complete unit can be easily removed and reinstalled from the vehicle for servicing.

It will be seen that I have provided a compact power unit that performs the normal functions of torque multiplying transmission, differential, torque multiplying axle and wheel brakes. The unit is adapted for use with a variety of engines and in a variety of vehicles without extensive modification. The invention is also easily adapted to various types of manual or automatic transmission and brake controls.

Other embodiments as well as changes and applications will be readily apparent to those skilled in the art and these can be made without departing from the spirit of the invention which is limited only by the following claims.

I claim:

1. A combined transmission and differential unit for a motor vehicle including a multispeed transmission unit having a single axis of rotation, input means for said transmission unit on said axis, a differential unit located on said axis on one side of said transmission unit, said differential unit including a planetary gear carrier member having a pair of intermeshing planet gears thereon and a pair of output sun gears each meshing with one of said planet gears, means connecting the output of the transmission to said carrier member, brake means engaged with said planet gears conditionable to simultaneously retard rotation of said sun gears, a pair of universal joints located on opposite sides of said transmission unit and rotatable on said axis, means extending through said transmission unit connecting one of said sun gears to one of said universal joints, means connecting the other of said sun gears to the other universal joint, and a pair of axis shafts each driven by one of said universal joints.

2. A combined transmission, differential and brake unit for a motor vehicle including a multispeed transmission unit having a single axis of rotation, input means for said transmission unit on said axis, a differential unit located on said axis on one side of said transmission unit, said differential unit including a planetary gear carrier member having a pair of intermeshing planet gears thereon and a pair of sun gears each meshing with one of said planet gears, means connecting the output of the transmission to said carrier member, a pair of universal joints located on opposite sides of said transmission unit and rotatable on said axis, means extending through said transmission unit connecting one of said sun gears to one of said universal joints, means connecting the other of said sun gears to the other universal joint, a pair of axle shafts each driven by one of said universal joints, a pair of brake members having internal teeth meshing with said planet gears, and means for retarding rotation of said brake members for braking said sun gears and through said universal joints brake the axle shafts.

3. A combined transmission and differential unit for a motor vehicle including a multispeed transmission unit having a single axis of rotation, input means for said transmission unit on said axle, a differential unit located on said axis on one side of said transmission unit, said differential unit including a planetary gear carrier member having a pair of intermeshing planet gears thereon and a pair of spaced sun gears each meshing with one of said planet gears, a plurality of brake discs internally geared to mesh with said planet gears and conditionable to retard rotation of said sun gears, means including fixed ratio speed reduction gearing connecting the output of the transmission to said carrier member, a pair of universal joints each located on one side of said transmission unit and rotatable on said axis, means including a shaft extending through said transmission unit connecting one of said sun gears to one of said universal joints, means connecting the other of said sun gears to the other universal joint within the confines of said differential unit, and a pair of axle shafts each driven by one of said universal joints.

4. A combined engine, transmission, and differential unit for a motor vehicle including an engine arranged on a first axis, a change speed transmission arranged on a second axis spaced from and parallel to said first axis, said transmission including a hydraulic torque transmitting device including a fluid impeller, power transmitting means connecting the output of said engine to the impeller of said hydraulic torque converter, said power transmitting means including predetermined fixed ratio drive means to drive said impeller at a predetermined speed relative to the speed of the engine, a fixed ratio final speed reduction mechanism rotatable on said second axis connected to the output of said change speed transmission, a differential mechanism rotatable on said second axis and having an input connected to said final speed reduction mechanism and a pair of differentially driven output members, and a pair of oppositely extending drive axle shafts each driven by one of said differentially driven output members, said predetermined fixed ratio drive means having its ratio determined by the speed-torque characteristics of said engine and the speed-torque characteristics of said hydraulic torque converter.

5. The combined unit of claim 4 wherein said power transmitting means includes a driving gear rotatable on said first axis and driven by said engine, an idler gear rotatable on an axis intermediate to said first and second axes and meshing with said driving gear, and a driven gear meshing with said idler gear and rotatable on said second axis and connected to drive said impeller.

6. The combined unit of claim 4 wherein said power transmitting means includes a first gear rotatable on said first axis and driven by said engine, a second gear rotatable on said second axis and connected to drive said impeller, means to transmit drive from said first to said second gears, the diameters of said first and said second gear determining the speed ratio of said power transmitting means.

7. The combined unit of claim 4 wherein said differential mechanism includes brake mechanism arranged to retard rotation of its driven output members, whereby the rotation of said drive axles is retarded.

8. The combined unit of claim 4 wherein said final speed reduction mechanism includes a planetary gear unit having a sun gear connected to the output of said change speed mechanism, a plurality of planet pinions meshing with said sun gear and rotatable on a planetary carrier, a stationary ring gear meshing with said planet pinions, and means connecting said carrier to the input of said differential mechanism.

9. A combined transmission and differential unit including a multispeed transmission unit having a single axis of rotation, input means for said transmission unit located on one side thereof, a differential unit located on the other side of said transmission unit, said differential unit including a planetary gear carrier member driven by the output of said transmission unit and having a pair of meshing planet gears thereon, said differential unit further including a first and second output sun gear each meshing with one of said planet gears, means engaged with said planet gears for simultaneously retarding rotation of said sun gears, a pair of universal joints located on opposite sides of said transmission unit and rotatable on said axis, one of said universal joints being located within the confines of said first sun gear, the other of said universal joints being located within the confines of said input means, means extending through said transmission unit connecting said second sun gear to the other of said universal joints, means connecting the other of said sun gears to the other of said universal joints and output means driven by each of said universal joints.

10. In a transmission, power-transmitting means, a differential unit having an input carrier driven by said power-transmitting means and first and second sun gears, meshing planetary gears supported on said carrier and meshing with sun gears, brake means meshing with said planetary gears for braking said sun gears, said brake means being coaxial with said planetary gears, means for engaging said last-mentioned means for simultaneously retarding rotation of said sun gears and said planetary gears, and a pair of driven members, one of said members being connected to said first sun gear extending through said transmission and the other of said members connected to said second sun gear and being mounted for a limited universal movement within the confines of said differential unit.

11. The structure defined in claim 10 wherein said power-transmitting means has a single output including a plurality of selectively engageable ratios including direct drive ratio, said brake means meshing with said planetary gears being provided by spaced annular brake disc members.

12. In combination: a multi-ratio transmission unit and a differential unit having a common axis of rotation; means rotatable about said axis of rotation for driving said transmission unit; first and second output members rotatable about said axis of rotation; said differential unit having an input carrier driven by said transmissioin unit, first and second coaxial output sun gears rotatable relative to each other and independently connected to said first and second output members, first planetary gear members meshing with one of said sun gears, second planetary gear members meshing with the other of said sun gears and said first planetary members, and said first and second planetary gear members being rotatably mounted on said carrier; first and second braking members having internal teeth meshing respectively with said first and second planetary gear members; means for simultaneously engaging said braking members for retarding rotation of said planetary gear members and said sun gears to provide simultaneous braking of said output members; and one of said output members extending through said transmission unit.

References Cited by the Examiner

UNITED STATES PATENTS

| | | | |
|---|---|---|---|
| 736,172 | 8/1903 | Talen et al. | 74—695 |
| 782,547 | 2/1905 | Coffee | 74—761 |
| 2,808,738 | 10/1957 | Bartell | 74—695 |
| 2,912,884 | 11/1959 | Christenson et al. | 74—720.5 |
| 2,918,830 | 12/1959 | O'Leary | 74—714 |
| 3,029,662 | 4/1962 | Hause | 74—695 |

FOREIGN PATENTS 1,147,281   6/1957   France.

DAVID J. WILLIAMOWSKY, *Primary Examiner.*

DON A. WAITE, *Examiner.*

T. C. PERRY, *Assistant Examiner.*